(12) United States Patent
Singh Bawa et al.

(10) Patent No.: US 12,530,326 B2
(45) Date of Patent: Jan. 20, 2026

(54) DATA AUGMENTATION AND ENRICHMENT

(71) Applicant: ACCENTURE GLOBAL SOLUTIONS LIMITED, Dublin (IE)

(72) Inventors: Gurpreet Singh Bawa, Gurgaon (IN); Kaustav Pakira, Mumbai (IN); Souvik Chakraborty, Kolkata (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 108 days.

(21) Appl. No.: 17/896,035

(22) Filed: Aug. 25, 2022

(65) Prior Publication Data

US 2023/0072607 A1    Mar. 9, 2023

(30) Foreign Application Priority Data

Aug. 31, 2021   (IN) .............................. 202111039431

(51) Int. Cl.
| G06F 16/215 | (2019.01) |
| G06F 9/445 | (2018.01) |
| G06F 16/28 | (2019.01) |

(52) U.S. Cl.
CPC ........ G06F 16/215 (2019.01); G06F 9/44526 (2013.01); G06F 16/283 (2019.01)

(58) Field of Classification Search
CPC ... G06F 16/215; G06F 16/283; G06F 9/44526
See application file for complete search history.

(56) References Cited

U.S. PATENT DOCUMENTS

| | | | |
|---|---|---|---|
| 11,516,036 B1* | 11/2022 | Harathi | H04L 12/1827 |
| 2014/0149446 A1* | 5/2014 | Kuchmann-Beauger | G06F 16/283 |
| | | | 707/763 |
| 2016/0048542 A1* | 2/2016 | Gluzman Peregrine | G06F 16/219 |
| | | | 707/692 |
| 2017/0212886 A1* | 7/2017 | Sarikaya | G10L 15/22 |
| 2018/0336228 A1* | 11/2018 | Krog Iverson | G06F 40/205 |
| 2020/0210647 A1* | 7/2020 | Panuganty | G06N 3/08 |
| 2021/0342490 A1* | 11/2021 | Briancon | G06F 21/14 |
| 2022/0067037 A1* | 3/2022 | Ranganathan | G10L 15/22 |

(Continued)

*Primary Examiner* — Tony Wu
(74) *Attorney, Agent, or Firm* — Mannava & Kang, P.C.

(57) ABSTRACT

Systems and methods for establishing data augmentation and enrichment within a data repository are disclosed, including a plug-in including an information relation charting engine, an analytical metric study engine, a derived record construction engine, and a configurational layer. The information relation charting engine receives raw data metrics from a production environment, determines a correspondence between field elements associated with each of the source and target schema, and correspondingly generates a mapping. The analytical metric study engine performs analytical analysis on the field elements present in the generated mapping and uses machine learning and previous data log to generate recommendations for the database. The derived record construction engine involves a deep learning model to generate relevant and usable data metrics based on the generated recommendations, which is then mapped to the relational database to generate augmented and enriched database.

18 Claims, 12 Drawing Sheets

(56) References Cited

U.S. PATENT DOCUMENTS

2022/0179833 A1\* 6/2022 Ramalingam ....... G06F 16/2237
2022/0343257 A1\* 10/2022 Mohanty ................. G06F 40/30

\* cited by examiner

```xml
<?xml version="1.0" encoding="UTF-8" ?>
<xs:schema xmlns:xs="Common.dimProduct">

<xs:element name="ProdAttr">
  <xs:complexType>
    <xs:sequence>
      <xs:element name="ProdGrpId" type="xs:string"/>
      <xs:element name="ProdType">
        <xs:complexType>
          <xs:sequence>
            <xs:element name="PrimaryIngredient" type="xs:string"/>
            <xs:element name="SecondaryIngredient" type="xs:string"/>
            <xs:element name="AddOn" type="xs:string"/>
          </xs:sequence>
        </xs:complexType>
      </xs:element>
      <xs:element name="ProductDesc" maxOccurs="unbounded">
        <xs:complexType>
          <xs:sequence>
            <xs:element name="LongDesc" type="xs:string"/>
            <xs:element name="ShortDesc" type="xs:string"/>
            <xs:element name="Brand" type="xs:string"/>
          </xs:sequence>
        </xs:complexType>
      </xs:element>
    </xs:sequence>
    <xs:attribute name="ProdID" type="xs:string" use="required"/>
  </xs:complexType>
</xs:element>

</xs:schema>
```

```xml
<?xml version="1.0" encoding="UTF-8" ?>
<xs:schema xmlns:xs="Common.FactOrder">

<xs:element name="OrderDesc">
  <xs:complexType>
    <xs:sequence>
      <xs:element name="OrderKey" type="xs:string"/>
      <xs:element name="ProductSesc">
        <xs:complexType>
          <xs:sequence>
            <xs:element name="MenuItemKey" type="xs:string"/>
            <xs:element name="CategoryKey" type="xs:string"/>
            <xs:element name="FlavorKey" type="xs:string"/>
            <xs:element name="LongDesc" type="xs:string"/>
            <xs:element name="ShortDesc" type="xs:string"/>
            <xs:element name="Brand" type="xs:string"/>
          </xs:sequence>
        </xs:complexType>
      </xs:element>
    </xs:sequence>
    <xs:attribute name="ProdID" type="xs:string" use="required"/>
  </xs:complexType>
</xs:element>

</xs:schema>
```

FIG. 5

DATA AUGMENTATION AND ENRICHMENT

PRIORITY CLAIM

This application claims priority under 35 U.S.C. 119(a)-(d) to Indian provisional application number 202111039431 filed on Aug. 31, 2021, the disclosure of which is incorporated by reference in its entirety.

BACKGROUND

As additional data is generated every day, handling and processing big data to provide relevant data to an end user has become progressively difficult. A data repository is a large database infrastructure that helps collect, manage, and store data sets or information for analysis, sharing, and reporting. Furthermore, as various sources of data within the data repository may be of interest to certain businesses and organizations, analyzing data from various assorted sources, developing robust models which produce insightful and readily results, and further deploying these models, have gotten much more troublesome. For example, a business may be interested in establishing associations among its customer base or study its products on offer, which may have latent benefits in different business levels, Such varying analytical requirements need multiple data science predictive and prescriptive models, which are heavily dependent on appropriate data.

Currently, businesses spend a large amount of time and resources just to build individual data models as per specific requirements. Further, the businesses must develop an understanding of the entire database mapping to decide on the key metrics that may be needed. Traditionally, a database management system (DBMS) administrative body may have the complete relational mapping and complete understanding of the data metrics to construct appropriate data models and also set up an assessment/audit protocol for future purposes. However, such conventional ways are time and resource-consuming, and the chances of data mismanagement and human error may also be high.

Furthermore, current techniques lack a specific understanding of the individual data mappings. Specifically, external supervision is mandatory when the individual data mappings are coupled with the derived data metric. The current techniques need to completely rely on external supervision which is tedious and challenging. Furthermore, this creates another hindrance in the environment as the structured querying instructions meant for a particular database may not be able to produce effective results when a similar pipeline is to be deployed on another database. As a result, when pipelines or the structured querying instructions specific to one database is deployed in another database, unnecessary components may get executed in existing practices. There may be several influencing factors behind such failures. For example, the components may be part of a larger pipeline which may have no ability to branch into sub pipelines for another database. Thus, the entire exercise is required to be repeated for different platforms, which may again involve reinvestigation, rewriting of instructions, retesting, and other such activities.

Because the primary structure block in these data models includes normalized and relevant data, there is therefore a need i to study raw metrics present in the database to identify potential metrics and enrich the database with the derived potential metrics in an automated manner. Further, there is a need to provide a plug-in that is not platform dependent and may be inserted into any other data warehouse, across platforms, or on the cloud, which may automate the entire data metric enrichment pipeline and remedy deficiencies in current systems.

SUMMARY

An embodiment of present disclosure relates to a system including a plug-in for data enrichment and augmentation within a data repository. The plug-in may include an information relation charting engine that may be operatively coupled to a processor. The processor may cause the information relation charting engine to receive, from the data repository, a set of raw data metrics pertaining to a relational database of a production environment. The processor may cause the information relation charting engine to determine a correspondence between one or more field elements associated with a set of source and target schema data files pertaining to the received set of raw data metrics. The correspondence may be determined by performing one or more heuristics analyses on each of the set of source and target schema data files. The processor may cause the information relation charting engine to generate an information relation charting based on the determined correspondence between the one or more field elements associated with each of the set of source and target schema data files. The information relation charting may be generated upon confirmation by an end user. The plug-in may also include an analytical metric study engine which may be operatively coupled to the processor. The processor may cause the analytical metric study engine to extract one or more key features of the relational database from the generated information relation charting. The one or more key features may be extracted by performing analytical metric analysis on the one or more field elements associated with the generated information relation charting. The extracted one or more key features may be stored as metadata. The analytical metric study engine may be operatively coupled to a machine learning engine. The processor may cause the machine learning engine of the analytical metric study engine to analyze log data associated with the production environment to determine previously recommended transformation for pre-stored metadata that may be found similar to the metadata generated by the analytical metric study engine. The processor may also cause the analytical metric study engine to generate a set of new recommendations based on the metadata generated by the analytical metric study engine. Further, the processor may cause the analytical metric study engine to merge the set of new recommendations and the previously recommended transformations to generate a final set of recommendations upon validation from the end user. The plug-in may also include a derived record construction engine which may be operatively coupled to the processor. The processor may cause a deep learning model that may be coupled to the derived record construction engine to derive a set of relevant and usable data metrics based on the generated final set of recommendations. The derived set of relevant and usable data metrics may then be mapped to the relational database at the same level in the data repository to generate an augmented and enriched database. Further, the processor may cause the derived record construction engine to ingest the generated augmented and enriched database into one or more data science modules.

Another embodiment of the present disclosure relates to a method for data enrichment and augmentation within a data repository. The method may include a step of receiving, by a processor, a set of raw data metrics pertaining to a relational database of a production environment from a data repository. The method may include a step of determining, by the processor, a correspondence between one or more field elements associated with a set of source and target schema data files pertaining to the received set of raw data metrics. The correspondence may be determined by performing one or more heuristics analyses on each of the set of source and target schema data files. The method may include a step of generating, by the processor, an information relation charting based on the determined correspondence between the one or more field elements associated with each of the set of source and target schema data files, and upon confirmation by an end user. The method may include a step of extracting, by the processor, one or more key features of the relational database from the information relation charting by performing analytical metric analysis on the one or more field elements associated with the generated information relation charting and storing the extracted one or more key features as metadata. The method may include a step of analyzing, by the processor, a log data associated with the production environment for determining previously recommended transformation for pre-stored metadata that is found similar to the metadata generated by the analytical metric study engine. The method may include a step of generating, by the processor, a set of new recommendations based on the metadata generated by the analytical metric study engine. Further, the method may include a step of merging, by the processor, the set of new recommendations and the previously recommended transformations to generate a final set of recommendations upon validation from the end user. The method may include a step of deriving, by the processor, a set of relevant and usable data metrics based on the generated final set of recommendations. The derived set of relevant and usable data metrics may be mapped to the relational database at the same level in the data repository to generate an augmented and enriched database. The method may include a step of ingesting, by the processor, the generated augmented and enriched database into one or more data science modules associated with the data repository.

Yet another embodiment of the present disclosure relates to a non-transitory computer-readable medium comprising machine-executable instructions that may be executable by a processor to receive a set of raw data metrics pertaining to a relational database of a production environment. The processor may be configured to determine a correspondence between one or more field elements associated with a set of source and target schema data files pertaining to the received set of raw data metrics. The correspondence may be determined by performing one or more heuristics analyses on each of the set of source and target schema data files. The processor may generate an information relation charting based on the determined correspondence between the one or more field elements associated with each of the set of source and target schema data files, upon confirmation by an end user. The processor may extract one or more key features of the relational database from the information relation charting by performing analytical metric analysis on the one or more field elements associated with the generated information relation charting, wherein the extracted one or more key features are stored as metadata. The processor may analyze log data associated with the production environment to determine previously recommended transformation for pre-stored metadata that is found similar to the metadata generated by the analytical metric study engine. The processor may generate a set of new recommendations based on the metadata generated by the analytical metric study engine. The set of new recommendations and the previously recommended transformations may be merged to generate a final set of recommendations upon validation from the end user. The processor may derive a set of relevant and usable data metrics based on the generated final set of recommendations. The derived set of relevant and usable data metrics may be mapped to the relational database at the same level in the data repository to generate an augmented and enriched database. The processor may ingest the generated augmented and enriched database into one or more data science modules associated with the data repository.

BRIEF DESCRIPTION OF DRAWINGS

FIG. 5 illustrates n exemplary diagram showing the traversing process performed on parsed XML formals of source and target schema data files by the information relation charting engine of the system of FIG. 1, according to an embodiment of the present disclosure.

DETAILED DESCRIPTION

Figure 1:
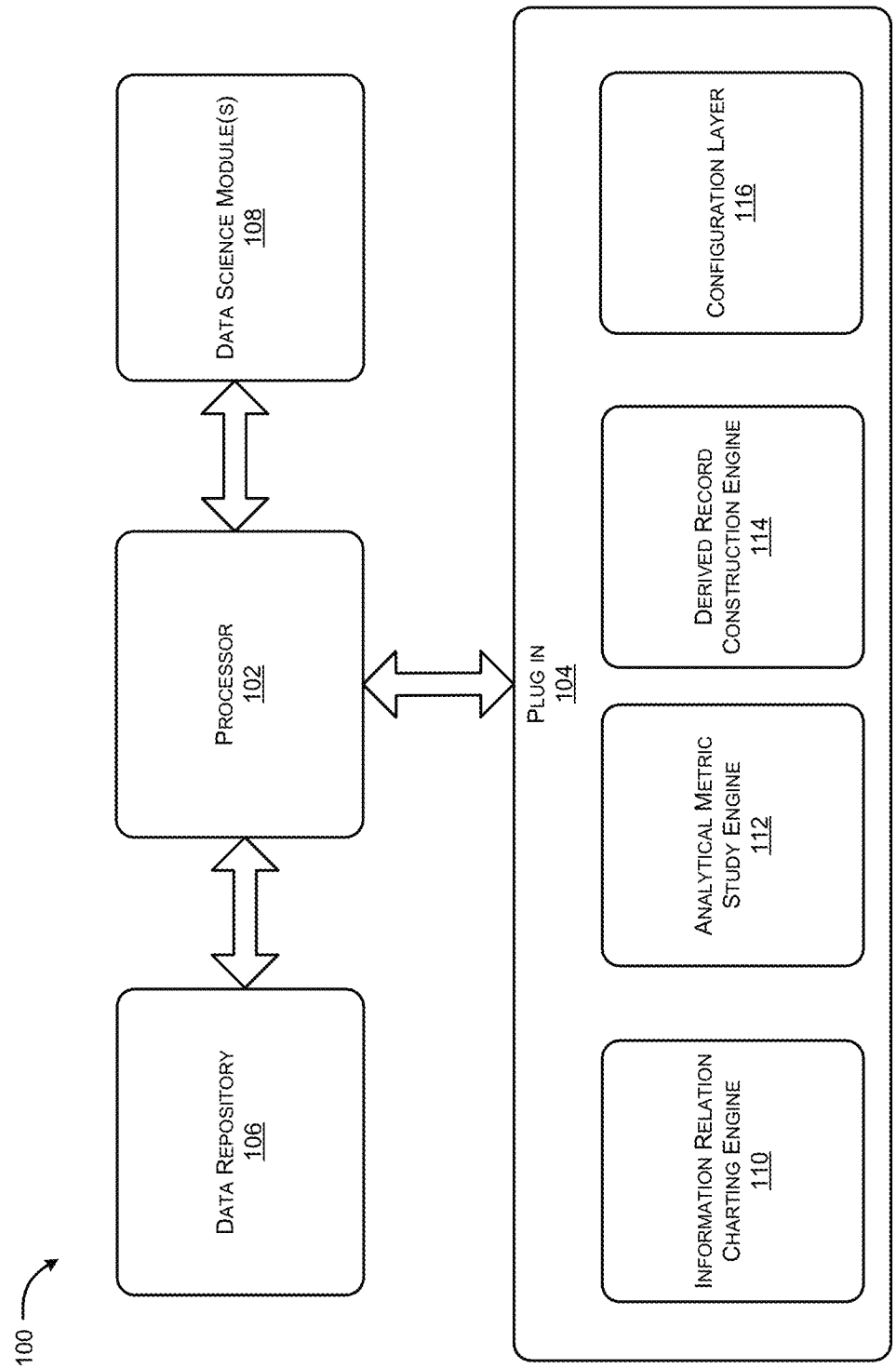
FIG. 1 illustrates an exemplary system diagram for the disclosed system for data enrichment and augmentation within a data repository, according to an embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being performed or considered.

Overview

Various embodiments described herein provide a solution, in the form of a system and a method, for data enrichment and augmentation within a data repository in an automated and optimized way. Specifically, the embodiments described herein provide a system and a method that address the issue of how to automate and optimize the data augmentation and enrichment process within a data repository. The embodiments described herein provide a system and a method that aid in automation and optimization of data augmentation and enrichment within a data repository by implementing artificial intelligence, heuristic analyses, and analytical analyses on raw data metrics that are present in a database to construct several relevant and usable data metrics, which may be further used for the enrichment of the database. Additionally, the embodiments described herein provide a solution, in form of a plug-in that is not platform-dependent and may be fitted into any other platform. The plug-in has end user based configuration features, which may allow the end users to configure or design or customize the plug-in as per their requirement. As a result, the plug-in is not platform-dependent and may be fitted into any other platform including data warehouse or on clouds; and may automate the entire data metric enrichment of the corresponding platform.

In an example embodiment, the system may include a plug-in for data enrichment and augmentation within a data repository. The plug-in may include an information relation charting engine which may be operatively coupled to a processor. The processor may cause the information relation charting engine to receive, from the data repository, a set of raw data metrics pertaining to a relational database of a production environment. The processor may cause the information relation charting engine to determine a correspondence between one or more field elements associated with a set of source and target schema data files pertaining to the received set of raw data metrics. The correspondence may be determined by performing one or more heuristics analyses on each of the set of source and target schema data files. The processor may cause the information relation charting engine to generate an information relation charting based on the determined correspondence between the one or more field elements associated with each of the set of source and target schema data files. The information relation charting may be generated upon confirmation by an end user. The plug-in may also include an analytical metric study engine which may be operatively coupled to the processor. The processor may cause the analytical metric study engine to extract one or more key features of the relational database from the generated information relation charting. The one or more key features may be extracted by performing analytical metric analysis on the one or more field elements associated with the generated information relation charting. The extracted one or more key features may be stored as metadata. The analytical metric study engine may be operatively coupled to a machine learning engine. The processor may cause the machine learning engine of the analytical metric study engine to analyze log data associated with the production environment to determine previously recommended transformation for pre-stored metadata that may be found similar to the metadata generated by the analytical metric study engine. The processor may also cause the analytical metric study engine to generate a set of new recommendations based on the metadata generated by the analytical metric study engine. Further, the processor may cause the analytical metric study engine to merge the set of new recommendations and the previously recommended transformations to generate a final set of recommendations upon validation from the end user. The plug-in may also include a derived record construction engine which may be operatively coupled to the processor. The processor may cause a deep learning model that may be coupled to the derived record construction engine to derive a set of relevant and usable data metrics based on the generated final set of recommendations. The derived set of relevant and usable data metrics may then be mapped to the relational database at the same level in the data repository to generate an augmented and enriched database. Further, the processor may cause the derived record construction engine to ingest the generated augmented and enriched database into one or more data science modules.

In an example embodiment, the plug-in may include a configurational layer that may be operatively coupled to the processor. The configurational layer may allow the end users to configure or design or customize the engines of the plug-in as per their requirement. As a result, the plug-in may is not platform dependent and may be fitted into any other data warehouse, across platforms, or on clouds, and may automate the entire data metric enrichment of the corresponding platform.

Referring to FIG. 1, where a block diagram for the disclosed system for data enrichment and augmentation within a data repository is disclosed, the system 100 may be implemented by way of a single device or a combination of multiple devices that may be operatively connected or networked together. System 100 may be implemented in hardware or a suitable combination of hardware and software. System 100 includes at least one processor 102. The processor 102 may be operatively coupled with plug-in 104. The plug-in 104 may include information relation charting engine 110, an analytical metric study engine 112, and a derived record construction engine 114. The processor 102 may be operatively coupled with the data repository 106 associated with a production environment, and one or more data science modules 108 (referred to as science modules 108, herein).

System 100 may be a hardware device including the processor 102 executing machine-readable program instructions to enrich and augment data within the data repository 106. Execution of the machine-readable program instructions by the processor 102 may enable the proposed system to establishing data enrichment and augmentation. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor 102 may include, for example, microprocessors, microcomputers, microcontrollers, digital signal processors, central processing units, state machines, logic circuits, and/or any devices that manipulate data or signals based on operational instructions. Among other capabilities, processor 102 may fetch and execute computer-readable instructions from a memory operationally coupled with system 100 for performing tasks such as data processing, input/output processing, feature extraction, and/or any other functions. Any reference to a task in the present disclosure may refer to an operation being, or that may be, performed on data.

In an example embodiment, the information relation charting engine 110 may receive a set of raw data metrics pertaining to a relational database of a production environment from the data repository 106. The information relation charting engine 110 may then determine a correspondence between the field elements associated with the source and target schema data files pertaining to the received set of raw data metrics. The correspondence may be determined by performing heuristics analyses on each of the set of source and target schema data files. Further, the information relation charting engine 110 may generate an information relation charting based on the determined correspondence between the field elements associated with each of the source and target schema data files, upon approval from end users.

In an example embodiment, the analytical metric study engine 112 may receive the mapping data or information relation charting created by the information relation charting engine 110 as an input. The analytical metric study engine 112 may then extract key features of the relational database from the information relation charting. The key features may be extracted by performing analytical metric analysis on the field elements associated with the information relation charting. The extracted key features may then be stored as metadata. The analytical metric study engine 112 may use a hybrid combination of machine learning pipeline, and historical data logs. The analytical metric study engine 112 may be operatively coupled to a machine learning engine. Processor 102 may cause the machine learning engine of the analytical metric study engine 112 to analyze log data associated with the production environment to determine previously recommended transformation for pre-stored metadata that may be found similar to the metadata generated by the analytical metric study engine. The analytical metric study engine 112 may generate a set of new recommendations based on the metadata generated by the analytical metric study engine 112. Further, analytical metric study engine 112 may merge the set of new recommendations and the previously recommended transformations to generate a final set of recommendations upon validation from the end user.

In an example embodiment, log data may be configured as a description of a historic transformation catalogue or any main data transformation journal including information on historic data enrichment. For instance, in the screenshot below, log data contains information that "CategoryKey"/"MenuItemKey" must be converted to string data type before deployment.

```
<xs:element name="OrderDesc">
    <xs:complexType>
        <xs:sequence>
            <xs:element name="OrderKey" type="xs:string"/>
            <xs:element name="ProductDesc">
```

-continued

```
<xs:complexType>
    <xs:sequence>
        <xs:element name="MenuItemKey" type="xs:string"/>
        <xs:element name="CategoryKey" type="xs:string"/>
```

In another example embodiment, recommendations for transformations may incorporate enrichment of existing data fields in the database in order to collect information more effectively by developing new "Key Performance Indicators". For instance, a database may include consumer-specific data on product purchases, in which scenario, the recommended transformations may be to change it to % of products unit w.r.t total unit for individual consumers which reflects the consumption pattern of individual consumers in more holistic way.

In an example embodiment, the derived record construction engine 114 may cause a deep learning model coupled therewith to derive a set of relevant and usable data metrics using the final set of recommendations (as a metric study) generated by the analytical metric study engine 112. The derived set of relevant and usable data metrics may then be mapped to the relational database at various levels in the data repository 106 to generate an augmented and enriched database. Further, processor 102 may cause the derived record construction engine 114 to ingest the generated augmented and enriched database into the data science module(s) 108. In an aspect, the augmented and enriched database constitutes recommended fields suggested by "Enrichment Recommendations". While a regular database constitutes of only raw data fields accumulated from raw data sources or different data sources which are not directly usable by any ML/DL algorithms for deriving insights/make models, the instant disclosure facilitates generation of relevant recommendations from historical log data and subsequently generates performance enhancement KPIs to eventually add them back to the original database for further use. An exemplary high level representation of the generated performance enhancement KPIs are presented below

|  | Data Base | | | Added KPI | | |
|---|---|---|---|---|---|---|
|  | | | | % | % | % |
|  | Product A | Product B | Product C | Product A | Product B | Product C |
| Consumer1 | 5 | 10 | 2 | 29% | 59% | 12% |
| Consumer2 | 8 | 5 | 12 | 32% | 20% | 48% |
| Consumer3 | 7 | 10 | 3 | 35% | 50% | 15% |
|  | | | | Enriched DataBase | | |

In an example embodiment, the plug-in 104 may include a configurational layer 116 which may be operatively coupled to the processor 102. The configurational layer 116 may allow the end users to configure or design or customize the engines of the plug-in 102 as per their requirement. As a result, the plug-in 104 is not platform dependent and may be fitted into any other data warehouse, across platforms, or on clouds, and may automate the entire data metric enrichment of the corresponding platform.

Figure 2:
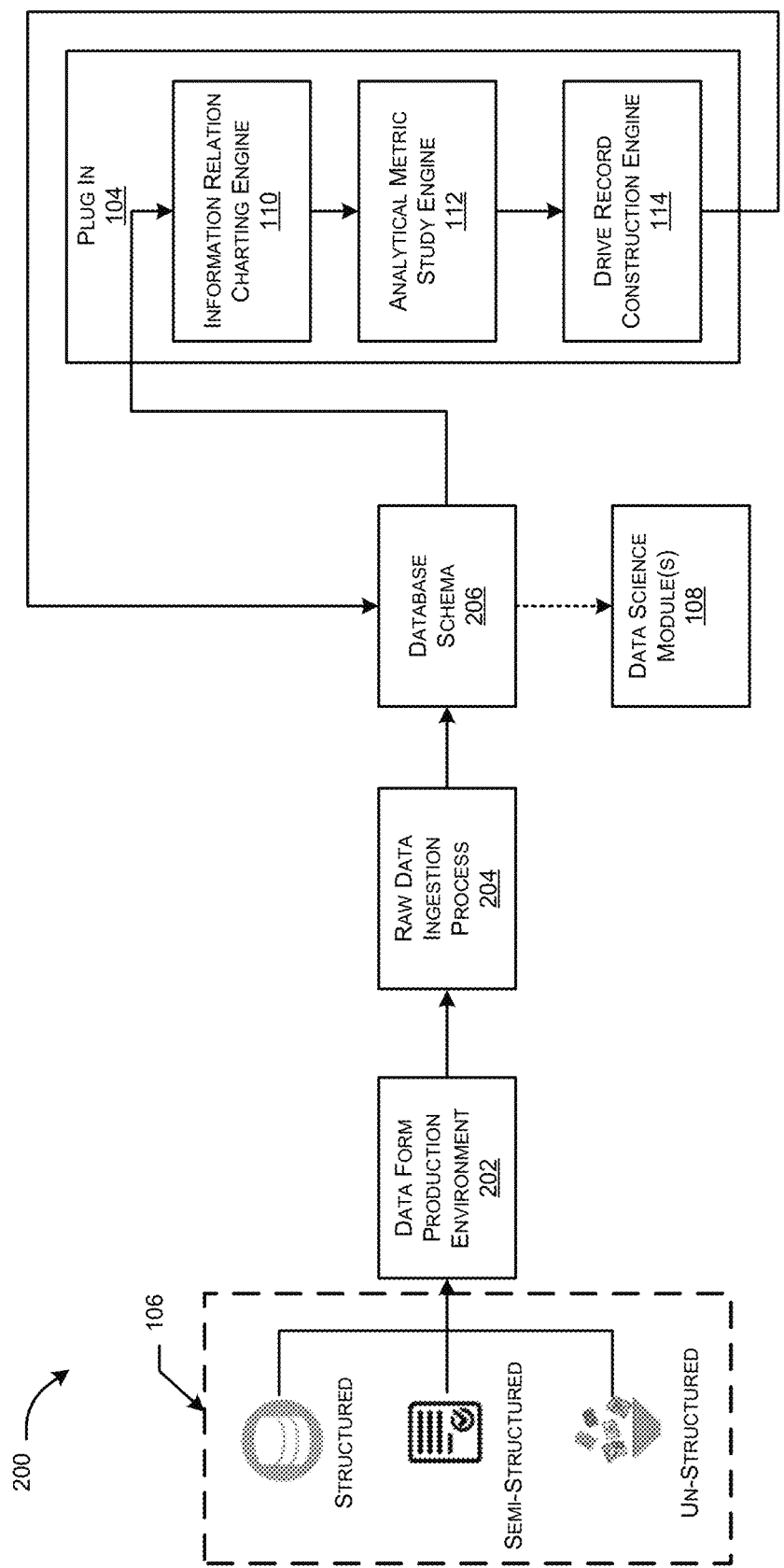
FIG. 2 illustrates an exemplary process flow diagram of the data enrichment and augmentation by the system of FIG. 1, according to an embodiment of the present disclosure.

Referring to FIG. 2, where a process flow diagram of the data enrichment and augmentation by the system of FIG. 1 is disclosed, as illustrated, the process 200 may involve a step of receiving a set of raw data metrics associated with a relational database of a production environment 202 from a data repository 106. In an example embodiment, the set of raw data metrics received from the data repository 106 may include structured, semi-structured, and unstructured data. The structured data may be those data whose elements are addressable for effective analysis, for example, relational data. The structured data may be organized into a formatted repository that is typically a database. Structured data may be stored in database SQL in a table with rows and columns. Structured data may have relational keys and may easily be mapped into pre-designed fields. The semi-structured data may be information that does not reside in a relational database but that has some organizational properties that make it easier to analyze, for example, XML data. Further, unstructured data may be data that is not organized in a predefined manner or does not have a predefined data model, making it not a good fit for a mainstream relational database. Unstructured data may include Word, PDF, Text, Media logs.

Process 200 may then involve step 204 of ingestion of the received set of raw data metrics into a database schema 206, which may then act as an p for the plug-in 104 for further processing. The plug-in 104 may implement artificial intelligence, heuristic analyses, and analytical analyses on raw data metrics using the information relation engine 110, analytical metric study engine 112, and derived record construction engine 114 to construct several relevant and usable data metrics which may be further used for the enrichment of the same database at various level. Further, the plug-in 104 may ingest the generated augmented and enriched database into one or more data science modules 108.

Figure 3:
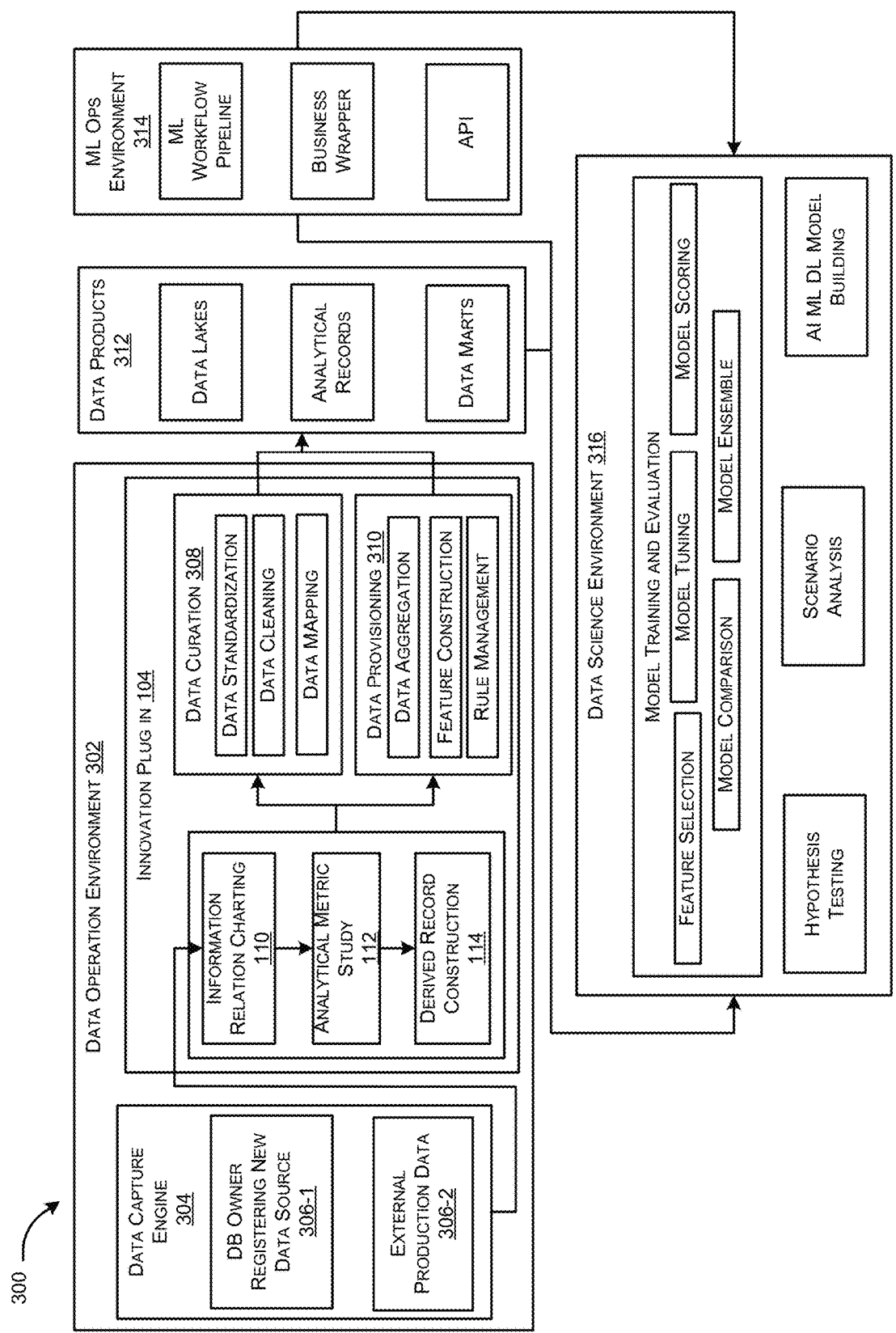
FIG. 3 illustrates an exemplary block diagram showing a scalable implementation of the data enrichment and augmentation plug-in of FIG. 1, according to an embodiment of the present disclosure.

FIG. 3 shows scalable implementation of the data enrichment and augmentation plug-in 104 of FIG. 1. As illustrated, the data operation environment 302 may include a data capture engine 304 operatively coupled to the processor 102 that may cause the data capture engine 304 to collect raw data metrics from a database 306-1 associated with the data repository as well as from external data sources 306-2. The plug-in 104 may then receive the captured raw data metrics from the data capture engine 304. The plug-in 104 may then implement artificial intelligence, heuristic analyses, and analytical analyses on raw data metrics using the information relation engine 110, analytical metric study engine 112, and derived record construction engine 114 to construct several relevant and usable data metrics or KPIs that may be further used for the enrichment of the same database at various level. The relevant and usable data metrics or the enriched database generated by the plug-in 104 may then be sent for data curation 308, and data provisioning 310 before ingesting them into data science modules. Further, the enriched database after data curation and data provisioning may be stored as data products 312 in data lakes, analytical records, data marts, and the likes. In an example embodiment, the enriched database may then be implemented in machine learning (ML) operation environments 314, such as ML workflow pipeline, business wrapper, and application programming interfaces (APIs). In another example embodiment, a data science environment 316 may directly receive the enriched database from the data products 312 or from the ML operation environments 314. The data science environment 316 may then use the enriched database generated by the system 100 or plug-in 104 for model training and evaluation purposes.

Figure 4:
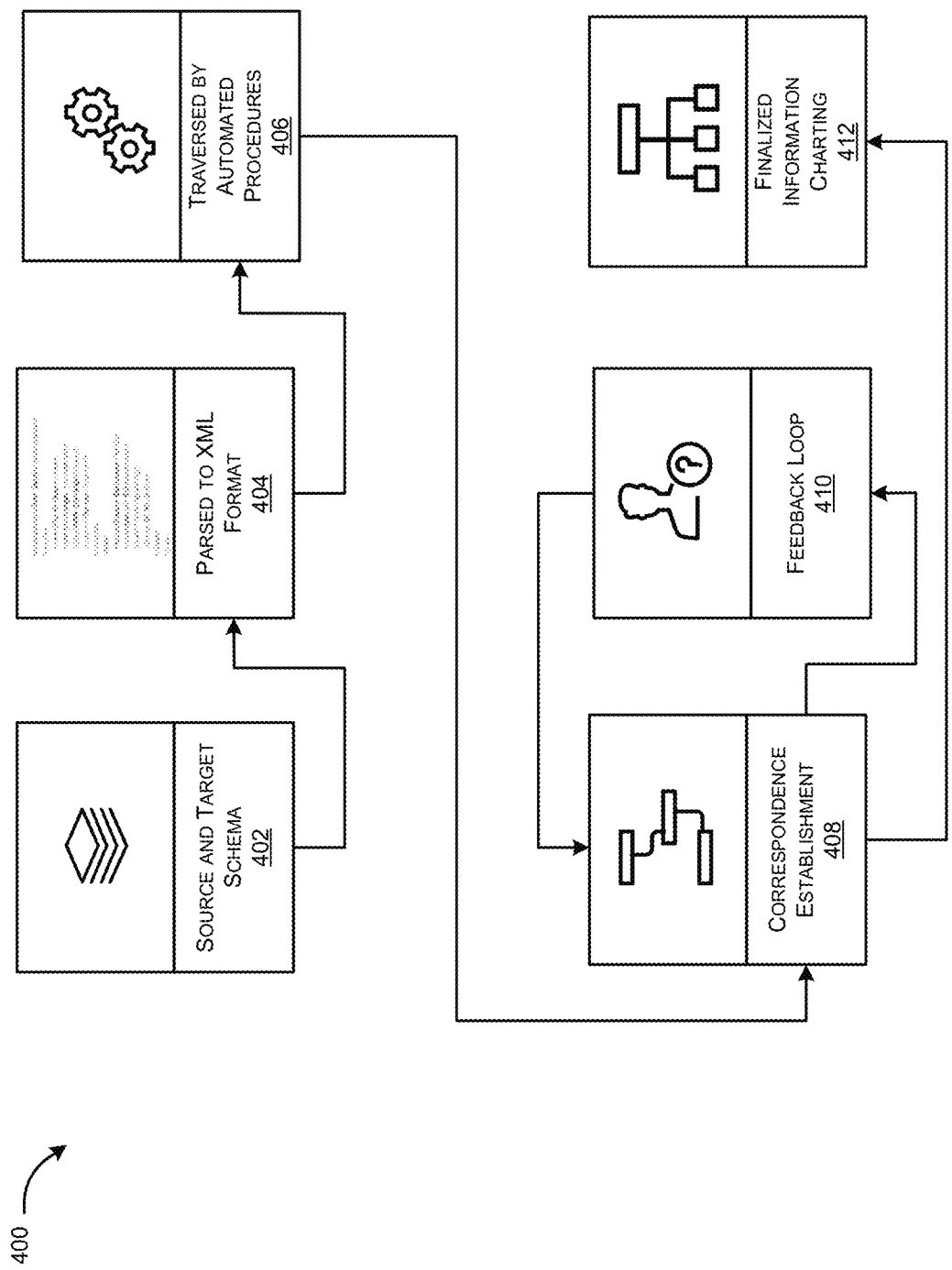
FIG. 4 illustrates an exemplary diagram showing a process of information relation charting by the information relation charting engine of the system of FIG. 1, according to an embodiment of the present disclosure.

Referring to FIG. 4, where an exemplary process of information relation charting by the information relation charting engine of the system of FIG. 1 is disclosed as shown therein, the information relation charting engine 110 may firstly parse the source and target schema data files 402 into XML format 404, and then iteratively analyze the XML format of the source and target schema data files using automated traversing procedures 406 that may involve heuristic analysis. This may allow heuristic exploration of the field elements in the source and target schema 402 or XML files 404 to determine if the elements or fields in the schema are having a likelihood or correspondence or if there is a translation relationship between the field elements of the source and target schema data files 402, as shown in FIG. 5. The automated traversing procedures 406 may target smaller subsets of the parsed source and target schema 404 for computational ease. The plug-in 104 may allow end users to accept, reject or defer the correspondence determined or predicted by the information relation charting engine 110. This may act as a feedback loop 410 which may facilitate the end users and the information relation charting engine 110 to learn about the areas of the schemas were the correspondences were not automatically explored, to establish the correspondence. Further, the relation charting process may be stopped by the end users if there are no fields to be mapped in the schema. Finally, based on the determined correspondence between the field elements of source and target schema, the information relation charting engine 110 may take the corresponding XML data files and may create a mapping or information relation charting 412 upon approval from the end users.

In an example embodiment, the heuristic analyses performed on the XML data file 404 of the source and data schema 402 may involve exact field name comparison, partial field name comparison, Levenshtein distance comparison, data type comparison, synonym comparison, domain-specific synonym comparison, but not limited to the likes. The information relation charting engine 110 may combine the predicted relations from the above heuristic analyses approaches, and may assign each relation a ranking weight. Further, all the weights for the predicted relations may be ranked and the schema field relations with the highest likelihood may be established to create the mapping or information relation charting 412.

In an example embodiment, the exact field name comparison may involve the comparison of field names between source and data schemas data files, followed by assigning weights for correspondence when two filed elements in the schema have the same field name. This heuristic analysis may work when field names are the same and unique across tables of the source and target schema. The partial field name comparison may involve finding a substring that may partially show similarity between the field names in the schema. For example, the filed names StoreID and PrimaryStoreID may be one such substring. This procedure may help convert names to the same case and recognize similar substrings within the names. The Levenshtein distance comparison may compute the "Levenshtein distance" between two field names, which is basically the count of changes needed to convert one string to another. Further, the lower the Levenshtein distance, the closer the field names. The data type comparison may involve comparing of data types of the field elements in the source and target schema data files. The synonym comparison may involve the comparison of field names, or parts of field names, to determine if they are synonyms of each other. For example, DOB and Date_Of_Birth, and Address and Street_Name, may be considered as synonyms. The domain-specific synonym comparison may involve a specific set of domain words to identify correspondence. For example, Treatment_Provider and Hospital are likely to be the same, if the domain is healthcare. Accordingly, the above heuristic analyses may assist the information relation charting engine 110 to determine the correspondence and further predict create the mapping or information relation charting 412.

Figure 6:
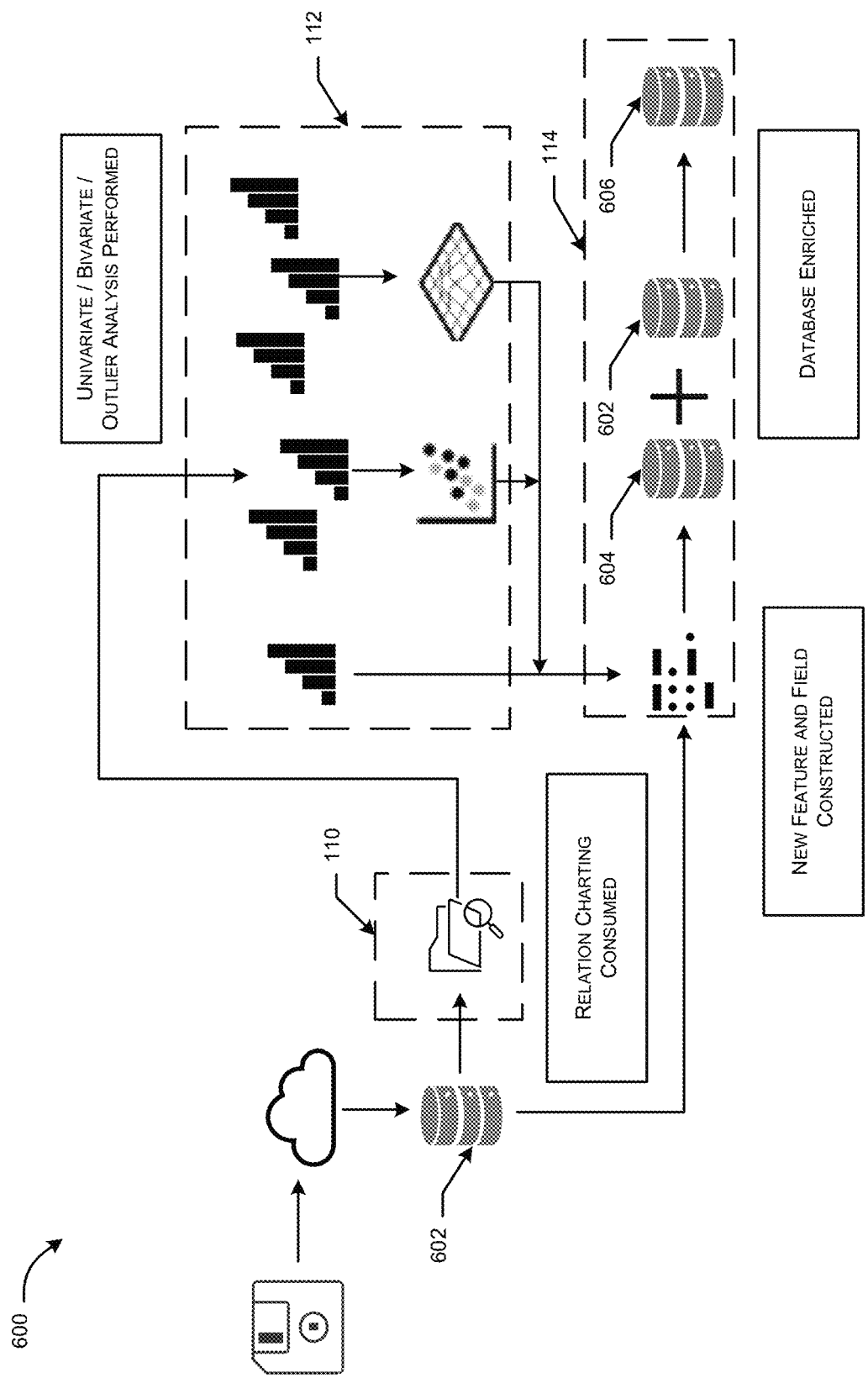
FIG. 6 illustrates an exemplary diagram showing a process of analytical metric study followed by a database enrichment process performed by the system of FIG. 1, according to an embodiment of the present disclosure.
Figure 7:
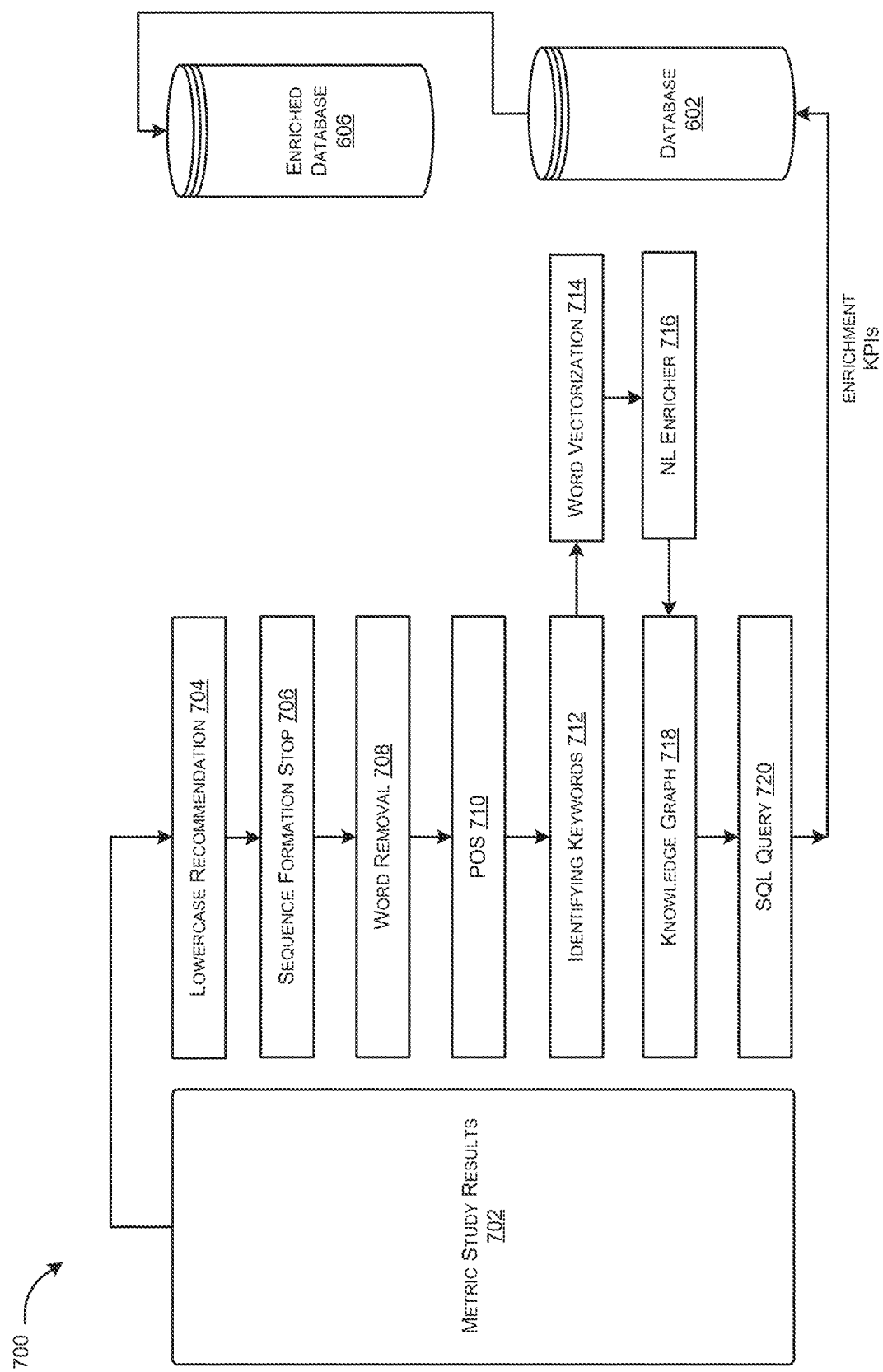
FIG. 7 illustrates an exemplary diagram showing a process of derived record construction for database enrichment by the derived record construction engine of the system of FIG. 1, according to an embodiment of the present disclosure.

Referring to FIGS. 6 and 7, the analytical metric study engine 112 of the plug-in 104 may help determine relational dependence or non-dependence between database in the relational database using the information relation charting (as an input) created by the information relation charting engine 110, which may help the analytical metric study engine 112 to identify key features, including primary, non-primary, and foreign features of the relational database 602. The analytical metric study engine 112 may create a temporary copy of the database 602, which may then be further processed by the hybrid machine learning pipeline. The first phase of the hybrid machine learning pipeline may extract the key features of the database 602. The analytical metric study engine 112 may perform analytical metric analysis involving quantile distribution, and the likes, to determine the key features, which may then be stored as metadata for the next phase of the pipeline. The second phase involves previous log data associated with the relational database. The log data may be analyzed by the machine learning engine to learn about past recommended transformations for pre-stored metadata that are found similar to the metadata stored in the first phase. Additionally, depending upon the current metadata (created by the analytical metric study engine 112), new recommendations may be generated and merged with the previous recommendations associated with the pre-stored metadata (derived by the machine learning engine) to create the final set of recommendations. Then, the final set of recommendations may be passed to the final phase of the pipeline, where the final set of recommendations may be validated in an automated manner and may be passed on as a summary report to get cross-checked by the end user. Only the recommendations which get validated by the end user may be sent to the derived record construction engine for further processing.

In an example embodiment, the analytical metric analysis performed by the analytical metric study engine 112 on the field elements of the information relation charting may involve numeric study, categorical study, univariate analysis, bivariate analysis, and outlier analysis. For instance, if the fields are numeric, the analysis may include statistics such as count, mean, standard deviation, mean, median, percentile, formation of the probability distribution, and the likes. Further, if the field is categorical, the analysis may include count, unique, and frequency statistics, A bar graph depicting the number of samples in each category may be generated, and a word count may be provided in case the data type is textual. Furthermore, a univariate analysis may be performed on all the individual numeric metrics present in the created information relation charting, Pairwise bivariate analysis may be performed on the field to understand the cross-variable distributions, where all the relevant numeric fields may be analyzed against a target variable.

Referring to FIG. 7, the derived record construction engine 114 may take the metric study 702 from the analytical metric study engine 112 as an input in natural language, and may then correspondingly generate structured SQL queries 720 which may help construct enrichment key performance index (KPIs) or the set of relevant and usable data metrics. These KPIs may then be mapped with the original database 602 at various levels to generate the enriched database 606. The natural language-based output (or tokens) corresponding to the metric data 702 may be lemmatized in the first stage to obtain the base form of the tokens. Next, the stop words may be removed and the remaining tokens may be case converted. Then the tokens from the same context windows may be grouped to create a sequence of sentences utilizing the root form of the tokens. These sequences of tokens may then be passed on to a deep long short-term memory (LSTM) model to enrich the natural language input, thereby making the natural language ingestible in the next step where the derived record construction engine may construct the structured SQL query 720 to construct the KPIs or relevant and usable data metrics.

In an example embodiment, before enriching the database 602 with the KPIs, as a pre-requisite, a word vector representation 714 may be trained by a pre-requisite model of the derived record construction engine to get a representation of the tokens in a stable vectorized format. The derived record construction model may use a reward function from query execution over the database within the loop of the pre-requisite model to learn a policy to generate the variable parts of the query. The pre-requisite model may be trained on Wikipedia data, and the likes, and leveraged to initialize the weights of initial layers, which may facilitate a reliable and stable representation of the unigram tokens. Then, the pre-requisite model may be leveraged to initialize the weight of the language-enriching deep LSTM model, which may take the sequence of phrases as input, and outputs a structured query 720, which may be used to construct the enrichment KPIs or the relevant and usable data metrics. Further, a linear search algorithm may be run by the derived record construction engine to identify the keywords 712 and subsequently identify the relational databases on which the query needs to be executed. In the final step, the keywords 712 may be fed into a parent query graph structure 718 to produce a final structured SQL query to generate the new enrichment KPIs. Once the SQL queries 720 are generated, they are effectively executed on the underlying database 602 to create enriched database 604. The resultant derived fields constructed may be further mapped to the original database schemas against the associated key features. Furthermore, normalized metrics, share metrics, RFM metrics, and the likes may constitute the derived fields, which may help in automatic augmentation of the database 602.

Figure 8:
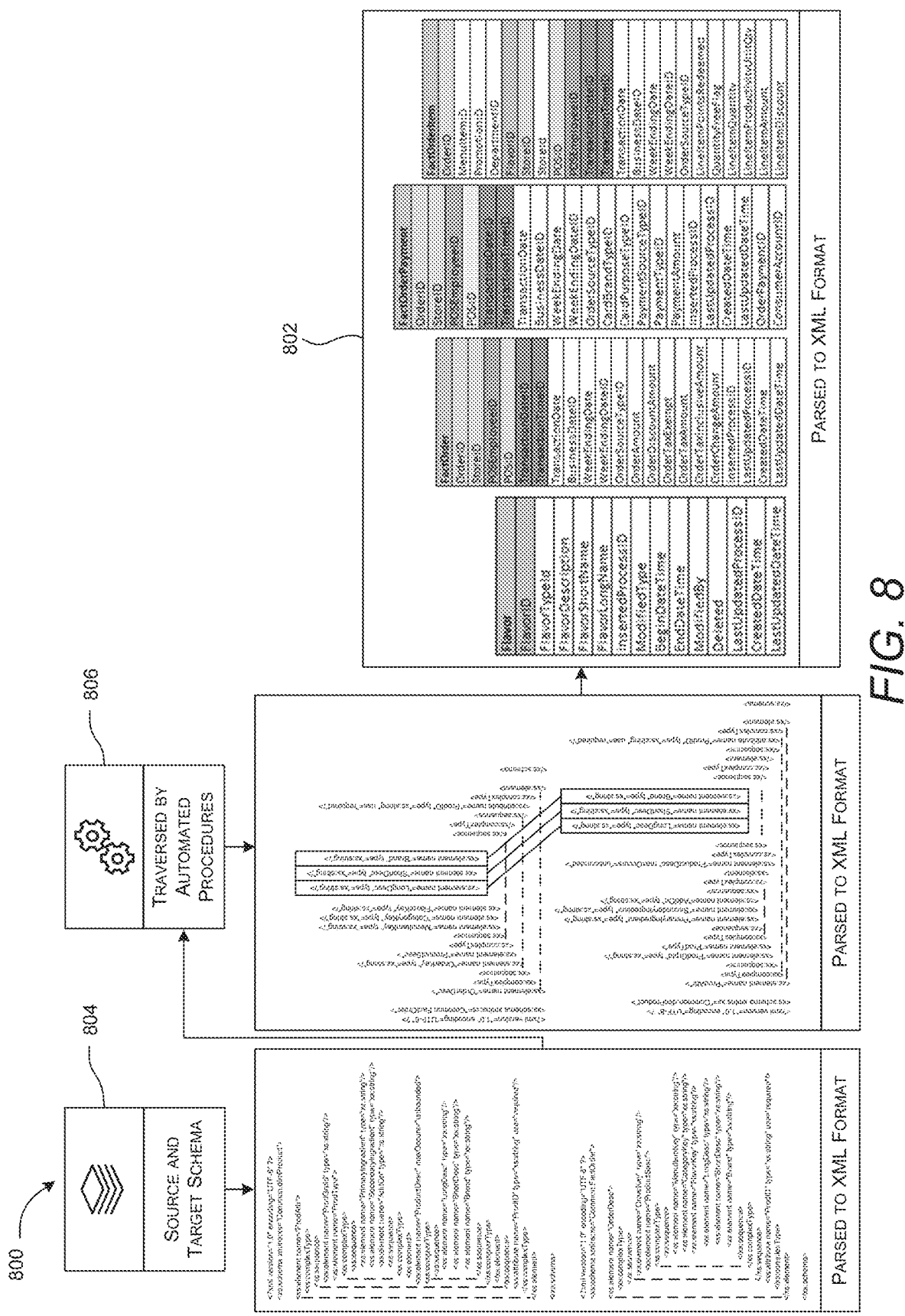
FIG. 8 illustrates an exemplary diagram depicting a use case implementation of the information relation charting engine of the system of FIG. 1, according to an embodiment of the present disclosure.
Figure 9:
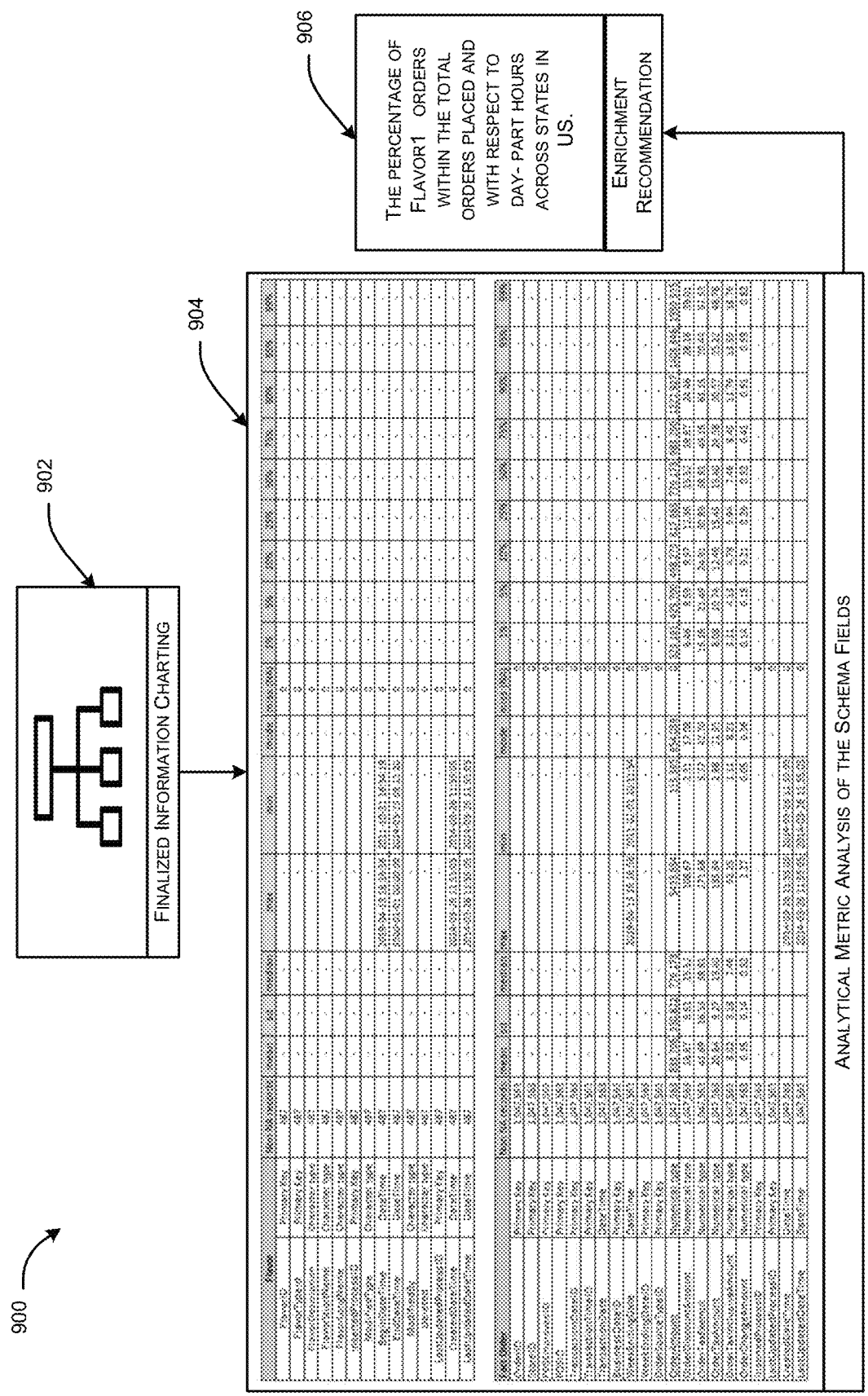
FIG. 9 illustrates an exemplary diagram depicting a use case implementation of the analytical metric study engine on the information relation charting generated in FIG. 8, according to an embodiment of the present disclosure.
Figure 10:
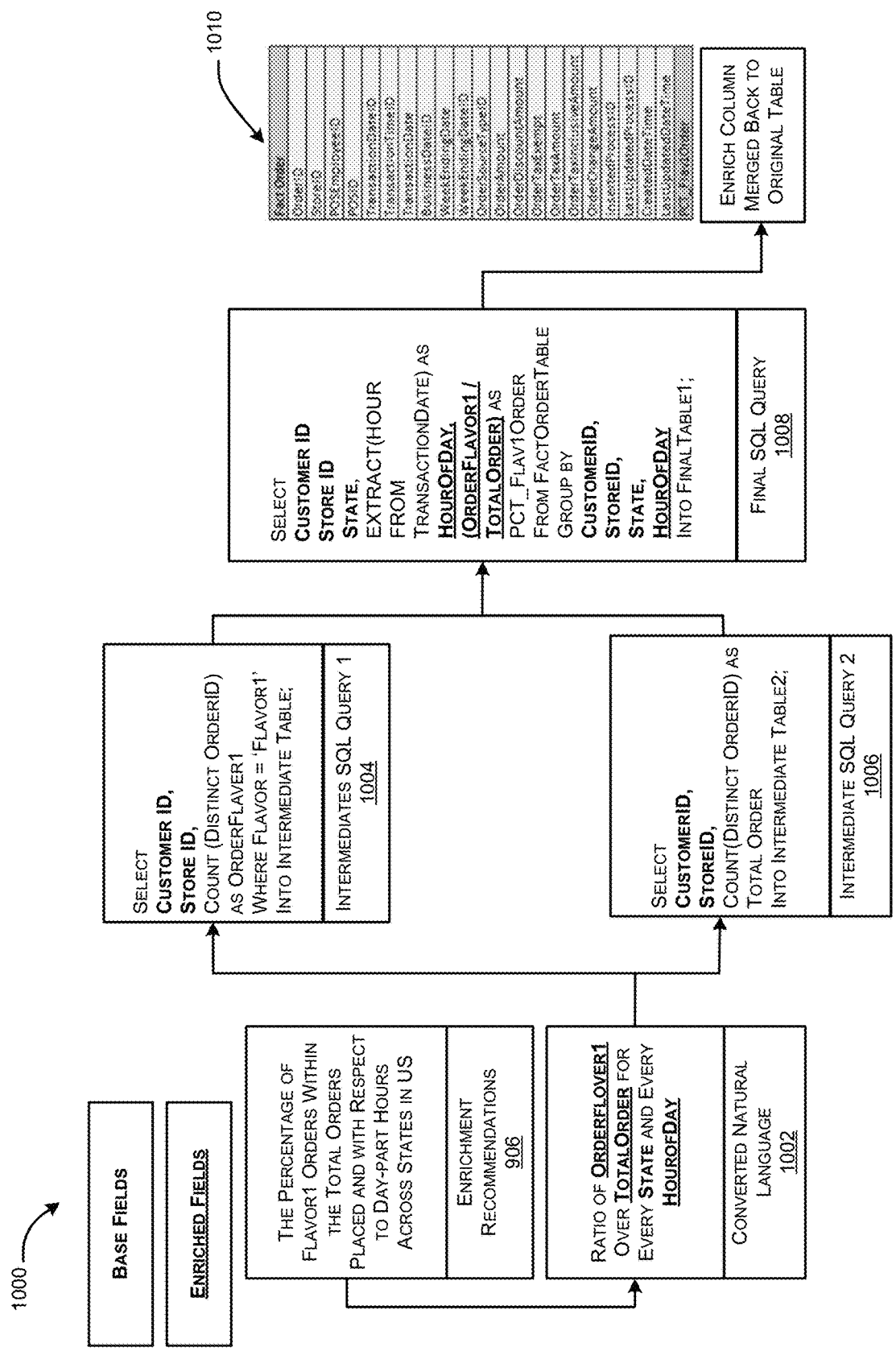
FIG. 10 illustrates an exemplary diagram depicting a use case implementation of the derived record construction engine on the data generated in FIG. 9, according to an embodiment of the present disclosure.

FIGS. 8-10 illustrate exemplary diagrams to depict the processing performed by the information relation charting engine, analytical metric study engine, and derived record construction engine of the system of FIG. 1. In an exemplary embodiment, a use case implementation 800 of the information relation charting engine is illustrated in FIG. 8. The information relation charting engine 110 may firstly parse the source and target schema data files into XML format, and then iteratively analyze the XML format of the source and target schema data files using automated traversing procedures (806) that may involve heuristic analysis. This may allow heuristic exploration of the field elements in the source and target schema (804) or XML files to determine if the elements or fields in the schema are having a likelihood or correspondence or if there is a translation relationship between the field elements of the source and target schema data files. In an example, as shown in FIG. 8, the field element 'FlavorID' associated with 'Flavor Table' and 'FactOrderItem Table' in schema 802 have correspondence. Similarly, the field elements 'OrderID', 'StoreID', 'POSID', 'POSEmployID', 'POSID', 'TransactionDateID', and 'TransactionTimeID' of the 'FactOrder Table', 'FactOrderpayment Table', and 'FactOrderItem Table have correspondence in the data schema. Finally, based on the determined correspondence between the field elements of source and target schema 802, the information relation charting engine 110 may take the corresponding XML data files and may create a mapping or information relation charting 902 upon approval from the end users.

In another exemplary embodiment, a use case implementation 900 of the analytical metric study engine is illustrated in FIG. 9. The analytical metric study engine 112 may receive the mapping data or information relation charting 902 created by the information relation charting engine 110 as an input. The analytical metric study engine 112 may then extract key features of the relational database from the information relation charting 902. The key features may be extracted by performing analytical metric analysis 904 on the field elements associated with the information relation charting. The extracted key features may be then be stored as metadata. The analytical metric study engine 112 may use a hybrid combination of machine learning pipeline, and historical data logs. The analytical metric study engine 112 may be operatively coupled to a machine learning engine. Processor 102 may cause the machine learning engine of the analytical metric study engine 112 to analyze log data associated with the production environment to determine previously recommended transformation for pre-stored metadata that may be found similar to the metadata generated by the analytical metric study engine. The analytical metric study engine 112 may generate a set of new recommendations based on the metadata generated by the analytical metric study engine 112. Further, analytical metric study engine 112 may merge the set of new recommendations and the previously recommended transformations to generate a final set of recommendations 906 upon validation from the end user. In an example, as shown in FIG. 9, the analytical metric study engine 112 may generate an enrichment recommendation 906 of "The percentage of Flavor 1 orders within the total orders placed and with respect to day part hours across states in US" by performing analytical metric analysis 904 of the schema fields associated with the information charting data 902 generated by the information relation charting engine.

In yet another exemplary embodiment, a use case implementation 1000 of the derived record construction engine is illustrated in FIG. 10. The derived record construction engine 114 may cause a deep learning model coupled therewith to derive a set of relevant and usable data metrics using the final set of recommendations (as a metric study) generated by the analytical metric study engine 112. The derived set of relevant and usable data metrics may then be mapped to the relational database at various levels in the data repository 106 to generate an augmented and enriched database. Further, processor 102 may cause the derived record construction engine 114 to ingest the generated augmented and enriched database into the data science module 108. In an example, as shown in FIG. 10, the derived record construction engine 114 may convert the enrichment recommendations 906 provided by the analytical metric study engine in FIG. 9 into natural language 1002, followed by converting the natural language 1002 into intermediate SQL queries (1004,1006). The base fields (marked bold), and enriched field (marked bold and underlined) associated with the intermediate SQL queries (1004,1006) may then be merged to provide a final SQL Query 1008, which may be used to enrich the original database to provide an enriched database 1010.

The entire exercise of the above use case implementation of FIG. 8-10 when done manually, may have taken 5 days for relation understanding, metric analysis, KPI enrichment for a database with 14 tables, 4 of which were large production data tables and others were medium-sized tables, followed by query development for 2 more days and query execution for 1 day. However, it is to be appreciated by a person skilled in the art that the proposed system and method takes a lithe over a day for the same exercise, thereby achieving roughly 70-80% improvement in efficiency compared to the manual exercise.

Figure 11:
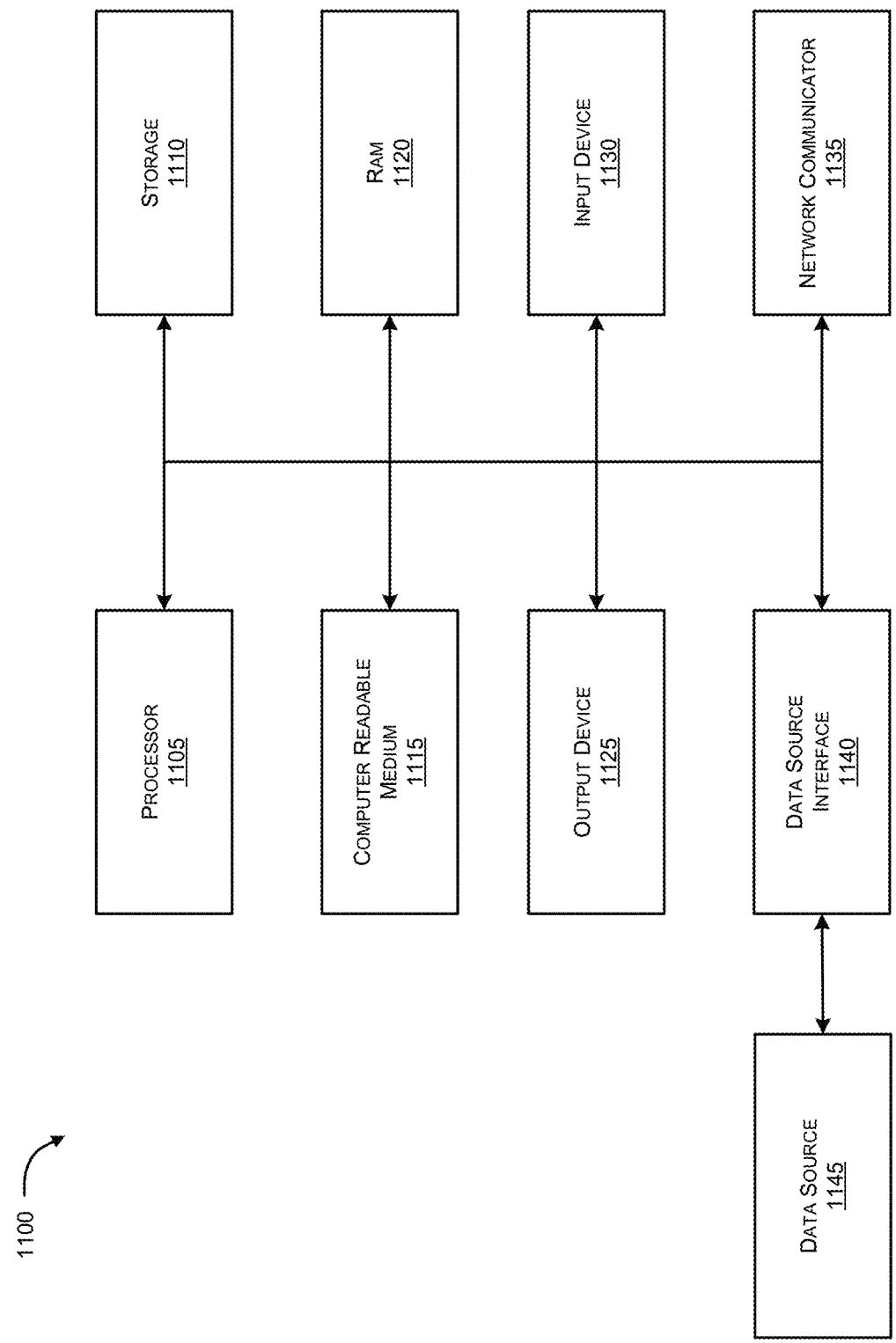
FIG. 11 illustrates a hardware platform for the implementation of the disclosed system, according to an embodiment of the present disclosure.

FIG. 11 illustrates a hardware platform 1100 for implementation of the disclosed system. For the sake of brevity, construction and operational features of the system 100 which are explained in detail above are not explained in detail herein, Particularly, computing machines, such as but not limited to internal/external server dusters, quantum computers, desktops, laptops, smartphones, tablets, and wearables which may be used to execute the system 100 or may include the structure of the hardware platform 1100. As illustrated, the hardware platform 1100 may include additional components not shown, and that some of the components described may be removed and/or modified. For example, a computer system with multiple GPUs may be located on external-cloud platforms including Amazon Web Services, or internal corporate cloud computing clusters, or organizational computing resources, etc.

The hardware platform 1100 may be a computer system, such as the system 100, that may be used with the embodiments described herein. The computer system may represent a computational platform that includes components that may be in a server or another computer system. The computer system may execute, by the processor 1105 (e.g., a single or multiple processors) or other hardware processing circuit, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 1105 that executes software instructions or code stored on a non-transitory computer-readable storage medium 1111 to perform methods of the present disclosure. The software code includes, for example, instructions to establishing data augmentation and enrichment within a data repository. In an example, components 104, 110, 112, 114, and/or 116, and may be software codes or components performing these steps.

The instructions on the computer-readable storage medium 1111 are read and stored the instructions in storage 1115 or in random access memory (RAM). The storage 1115 may provide a space for keeping static data where at least some instructions could be stored for later execution. The stored instructions may be further compiled to generate other representations of the instructions and dynamically stored in the RAM, such as RAM 1120. The processor 1105 may read instructions from the RAM 1120 and perform actions as instructed.

The computer system may further include the output device 1125 to provide at least some of the results of the execution as output including, but not limited to, visual information to users, such as external agents. The output device 1125 may include a display on computing devices and virtual reality glasses. For example, the display may be a mobile phone screen or a laptop screen. GUIs and/or text may be presented as an output on the display screen. The computer system may further include an input device 1130 to provide a user or another device with mechanisms for entering data and/or otherwise interact with the computer system. The input device 1130 may include, for example, a keyboard, a keypad, a mouse, or a touchscreen. Each of these output devices 1125 and input device 1130 may be joined by one or more additional peripherals. For example, the output device 1125 may be used to display intermediate and/or final results of establishing data augmentation and enrichment by the system 100.

A network communicator 1135 may be provided to connect the computer system to a network and in turn to other devices connected to the network including other clients, servers, data stores, and interfaces, for instance. A network communicator 1135 may include, for example, a network adapter, such as a LAN adapter or a wireless adapter. The computer system may include a data sources interface 1140 to access the data source 1145. The data source 1145 may be an information resource. As an example, a database of exceptions and rules may be provided as the data source 1145. Moreover, knowledge repositories and curated data may be other examples of data source 1145.

Figure 12:
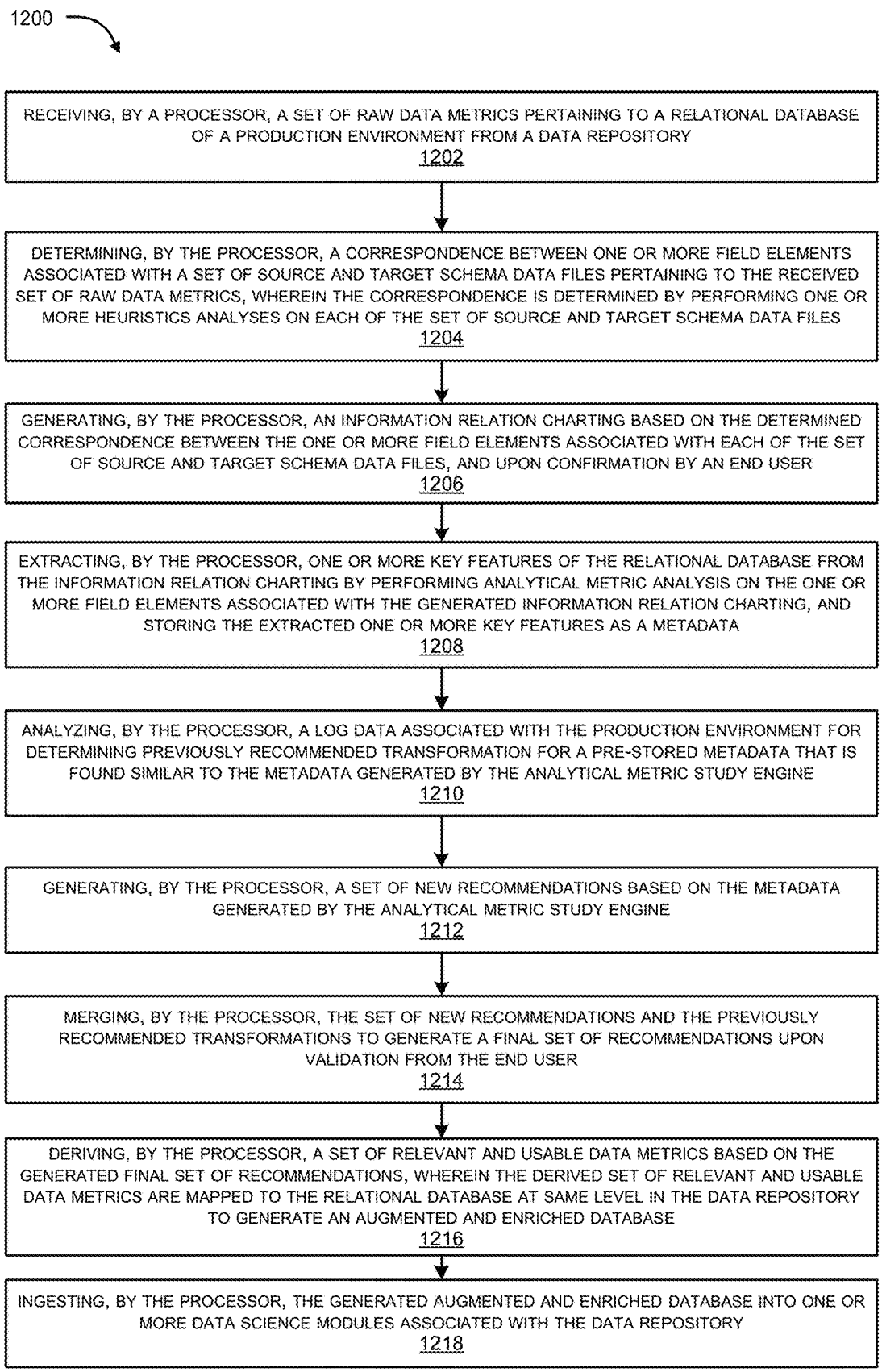
FIG. 12 illustrates an exemplary method flow diagram for the disclosed method for data enrichment and augmentation within a data repository, according to an embodiment of the present disclosure.

FIG. 12 illustrates a method flow diagram for the disclosed method 1200 for data enrichment and augmentation within a data repository. At 1202, the method may include the step of receiving, by a processor, a set of raw data metrics pertaining to a relational database of a production environment from a data repository. At 1204, the method may include the step of determining, by the processor, a correspondence between one or more field elements associated with a set of source and target schema data files pertaining to the set of raw data metrics received at step 1202. The correspondence may be determined by performing one or more heuristics analyses on each of the set of source and target schema data files. At 1206, method 1200 may include the step of generating, by the processor, an information relation charting based on the determined correspondence between the one or more field elements associated with each of the set of source and target schema data files, and upon confirmation by an end user. At 1208, method 1200 may include the step of extracting, by the processor, one or more key features of the relational database from the information relation charting by performing analytical metric analysis on the one or more field elements associated with the generated information relation charting and storing the extracted one or more key features as metadata. At step 1210, method 1200 may further include the step of analyzing, by the processor, a log data associated with the production environment for determining previously recommended transformation for pre-stored metadata that is found similar to the metadata generated by the analytical metric study engine. At step 1212, method 1200 may further include the step of generating, by the processor, a set of new recommendations based on the metadata generated by the analytical metric study engine. At step 1214, method 1200 may further include the step of merging, by the processor, the set of new recommendations, and the previously recommended transformations to generate a final set of recommendations upon validation from the end user. At step 1216, method 1200 may further include the step of deriving, by the processor, a set of relevant and usable data metrics based on the generated final set of recommendations. The derived set of relevant and usable data metrics may be mapped to the relational database at the same level in the data repository to generate an augmented and enriched database. At step 1218, method 1200 may further include the step of ingesting, by the processor, the generated augmented and enriched database into one or more data science modules associated with the data repository.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
an information relation charting engine operatively coupled to a processor that causes the information relation charting engine to:
receive, from a data repository, a set of raw data metrics from a database;
determine a correspondence between one or more field elements associated with a set of source and target schema data files pertaining to the received set of raw data metrics; and
generate an information relation charting based on the determined correspondence between the one or more field elements associated with each of the set of source and target schema data files;
an analytical metric study engine operatively coupled to the processor that causes the analytical metric study engine to:
extract one or more key features of the database from the generated information relation charting by performing analytical metric analysis on the one or more field elements associated with the generated information relation charting, wherein the extracted one or more key features are stored as metadata, wherein the analytical metric study engine performs analytical metric analysis comprising numeric study, categorical study, univariate analysis, bivariate analysis, and outlier analysis;
analyze, through a machine learning engine, a log data associated with the production environment to determine previously recommended transformations to pre-stored metadata that is found similar to the metadata generated by the analytical metric study engine; and
generate a set of new recommendations based on the metadata generated by the analytical metric study engine, wherein the set of new recommendations and the previously recommended transformations are merged to generate a final set of recommendations upon validation from the end user; and
a derived record construction engine operatively coupled to the processor that causes the derived record construction engine to:
derive, through a deep learning model, a set of relevant and usable data metrics based on the generated final set of recommendations, wherein the derived set of relevant and usable data metrics are mapped to the database at a level in the data repository to generate an augmented and enriched database wherein the derived set of relevant and usable data metrics correspond to a key performance index,
wherein a plug-in is platform independent and is operatively coupled to at least one of a data warehouse, data platform, and a cloud to enable data metric enrichment.

2. The system of claim 1, wherein the correspondence is determined by performing one or more heuristics analyses on each of the set of source and target schema data files.

3. The system of claim 1, wherein the information relation charting is generated upon confirmation by an end user.

4. The system of claim 1, wherein the processor further causes the derived record construction engine to ingest the generated augmented and enriched database into one or more data science modules associated with the data repository.

5. The system of claim 1, wherein the system comprises the plug in for data enrichment and augmentation within a data repository, wherein the plug in comprises the information relation charting engine, the analytical metric study engine, and the derived record construction engine.

6. The system of claim 1, wherein the system further includes a configurational layer to allow customization of at least one of the information relation charting engine, the analytical metric study engine, and the derived record construction engine.

7. The system of claim 1, wherein the set of raw data metrics pertain to a relational database of a production environment.

8. The system of claim 1, wherein the analytical metric study engine uses a combination of machine learning pipeline and historical data logs.

9. The system of claim 1, wherein the set of raw data metrics received from the data repository comprise at least one of structured, semi-structured, and unstructured data.

10. The system of claim 2, wherein the one or more heuristics analyses on each of the set of source and target schema data files comprises at least one of field name comparison, partial field name comparison, Levenshtein distance comparison, data type comparison, synonym comparison, and domain-specific synonym comparison, wherein the information relation charting engine combines predicted relations obtained from the one or more heuristics analyses and assign each relation a ranking weight such that all weights for the predicted relations are ranked, and schema field relations with highest likelihood is established to create the information relation charting.

11. The system of claim 1, wherein the set of relevant and usable data metrics corresponds to natural language-based tokens that are lemmatized to obtain base form of tokens such that tokens from same context windows are grouped to create a sequence of tokens that are passed on to a deep long short-term memory (LSTM) model to enrich natural language input and make the natural language ingestible.

12. The system of claim 1, wherein the derived record construction engine converts the generated final set of recommendations into natural language, followed by converting the natural language into intermediate SQL queries, wherein base fields and enriched fields associated with the intermediate SQL queries are merged to provide a final SQL query that is used to enrich the database.

13. The system of claim 11, wherein the system trains a word vector representation using a pre-requisite model of the derived record construction engine in order to obtain a representation of the tokens in a stable vectorized format.

14. A method comprising:
receiving, from a data repository, by a processor, a set of raw data metrics from a database;
determining, by the processor, a correspondence between one or more field elements associated with a set of source and target schema data files pertaining to the received set of raw data metrics;
generating, by the processor, an information relation charting based on the determined correspondence between the one or more field elements associated with each of the set of source and target schema data files;
extracting, by the processor, one or more key features of the database from the generated information relation charting by performing analytical metric analysis on the one or more field elements associated with the generated information relation charting, wherein the extracted one or more key features are stored as metadata, wherein the analytical metric analysis comprises numeric study, categorical study, univariate analysis, bivariate analysis, and outlier analysis;
analyzing, through a machine learning engine operatively coupled with the processor, a log data associated with the production environment to determine previously recommended transformations for pre-stored metadata that is found similar to the metadata;
generating, by the processor, a set of new recommendations based on the metadata, wherein the set of new recommendations and the previously recommended transformations are merged to generate a final set of recommendations upon validation from the end user; and
deriving, through a deep learning model operatively coupled with the processor, a set of relevant and usable data metrics based on the generated final set of recommendations, wherein the derived set of relevant and usable data metrics are mapped to the database at a level in the data repository to generate an augmented and enriched database wherein the derived set of relevant and usable data metrics correspond to a key performance index,
wherein a plug-in is platform independent and is operatively coupled to at least one of a data warehouse, data platform, and a cloud to enable data metric enrichment.

15. The method of claim 14, wherein the correspondence is determined by performing one or more heuristics analyses on each of the set of source and target schema data files, and wherein the one or more heuristics analyses on each of the set of source and target schema data files comprises at least one of field name comparison, partial field name comparison, Levenshtein distance comparison, data type comparison, synonym comparison, and domain-specific synonym comparison, wherein the method further comprises combining predicted relations obtained from the one or more heuristics analyses and assign each relation a ranking weight such that all weights for the predicted relations are ranked, and schema field relations with highest likelihood is established to create the information relation charting.

16. The method of claim 14, wherein the method further comprises ingesting, by the processor, the generated augmented and enriched database into one or more data science modules associated with the data repository.

17. The method of claim 14, wherein the set of raw data metrics pertain to a relational database of a production environment, and wherein the set of raw data metrics received from the data repository comprise at least one of structured, semi-structured, and unstructured data.

18. A non-transitory computer-readable medium, wherein the readable medium comprises machine-executable instructions that are executable by a processor to:
receive, from a data repository, a set of raw data metrics from a database;

determine a correspondence between one or more field elements associated with a set of source and target schema data files pertaining to the received set of raw data metrics;

generate an information relation charting based on the determined correspondence between the one or more field elements associated with each of the set of source and target schema data files, extract one or more key features of the database from the generated information relation charting by performing analytical metric analysis on the one or more field elements associated with the generated information relation charting, wherein the extracted one or more key features are stored as metadata, wherein the analytical metric analysis comprises numeric study, categorical study, univariate analysis, bivariate analysis, and outlier analysis;

analyze, through a machine learning engine, a log data associated with the production environment to determine previously recommended transformations for pre-stored metadata that is found similar to the metadata;

generate a set of new recommendations based on the metadata, wherein the set of new recommendations and the previously recommended transformations are merged to generate a final set of recommendations upon validation from the end user; and derive, through a deep learning model, a set of relevant and usable data metrics based on the generated final set of recommendations, wherein the derived set of relevant and usable data metrics are mapped to the database at a level in the data repository to generate an augmented and enriched database wherein the derived set of relevant and usable data metrics correspond to a key performance index, wherein a plug-in is platform independent and is operatively coupled to at least one of a data warehouse, data platform, and a cloud to enable data metric enrichment.

* * * * *